United States Patent [19]

Morris et al.

[11] 4,420,607

[45] Dec. 13, 1983

[54] POLYESTERS OF TRANS-4,4-STILBENEDICARBOXYLIC ACID, TEREPHTHALIC ACID OR 2,6-NAPHTHALENEDICARBOXYLIC ACID, AND 1,2-PROPANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 475,567

[22] Filed: Mar. 15, 1983

[51] Int. Cl.³ ............... C08G 63/18; C08G 63/54
[52] U.S. Cl. ............... 528/298; 528/299; 528/302; 528/303; 528/304; 528/305; 528/306
[58] Field of Search ............... 528/298, 299, 302, 303, 528/304, 305, 306

[56] References Cited

U.S. PATENT DOCUMENTS

| | | | |
|---|---|---|---|
| 2,657,194 | 10/1953 | Butler et al. | 528/306 |
| 3,190,764 | 10/1965 | Cardina | 427/407.1 |
| 3,247,043 | 4/1966 | Cardina | 427/400 |
| 3,496,839 | 2/1970 | Hartle | 528/306 |
| 3,842,040 | 10/1974 | Browne et al. | 528/364 |
| 3,842,041 | 10/1974 | Browne et al. | 528/176 |

*Primary Examiner*—Lester L. Lee
*Attorney, Agent, or Firm*—William P. Heath, Jr.; Daniel B. Reece, III

[57] ABSTRACT

This invention relates to polyesters of high molecular weight useful as films, fibers and molding plastics. It is particularly concerned with copolyesters comprising repeating units from trans-4,4'-stilbenedicarboxylic acid, optionally 0–40 mol % of terephthalic acid or 2,6-naphthalenedicarboxylic acid, and 1,2-propanediol, the polyesters having an inherent viscosity of about 0.3 or more and a flexural modulus of at least 900,000 psi.

5 Claims, No Drawings

POLYESTERS OF TRANS-4,4-STILBENEDICARBOXYLIC ACID, TEREPHTHALIC ACID OR 2,6-NAPHTHALENEDICARBOXYLIC ACID, AND 1,2-PROPANEDIOL

DESCRIPTION

This invention relates to polyesters of high molecular weight useful as films, fibers and molding plastics. It is particularly concerned with copolyesters comprising repeating units from trans-4,4'-stilbenedicarboxylic acid, optionally 0-40 mol % of terephthalic acid or 2,6-naphthalenedicarboxylic acid, and 1,2-propanediol, the polyesters having an inherent viscosity of about 0.3 or more and a flexural modulus of about 900,000 psi or more.

This invention provides molding plastics with superior strength and stiffness compared to those of conventional polyesters prepared from symmetrical aromatic acids and aliphatic glycols. Fibers and films with high tensile strength and exceptionally high modulus may be made from the polyesters of this invention.

PRIOR ART

Japanese Kokai No. 72348/74 discloses the polymer of 100 mol % trans-4,4'-stilbenedicarboxylic acid and 1,6-hexanediol blended with poly(1,4-butylene terephthalate). There is no teaching in this prior art that shaped objects having unusually high strength and stiffness are obtainable.

U.S. Pat. No. 2,657,195 discloses polyesters, polyamides and polyesteramides prepared from various isomeric stilbenedicarboxylic acids and glycols containing from 2 to 16 carbons. Example 1 and Example 5 are homopolyesters of ethylene glycol and 1,5-pentanediol. The remaining examples deal with polyesters prepared from terephthalic acid and stilbenedicarboxylic acid and ethylene glycol. Polyesters of 1,2-propanediol are not specifically disclosed in the patent.

U.S. Pat. No. 3,496,839 discloses low molecular weight homopolyesters of 4,4'-stilbenedicarboxylic acid and glycols containing 2 to 20 carbon atoms. In Column 2, lines 25 and 41 specifically mention 1,2-propanediol (propylene glycol) in a general listing of useful glycols for the invention. However, all the examples concern low molecular weight polyesters of 4,4'-stilbenedicarboxylic acid, neopentyl glycol, and terephthalic acid. It is also important to note that none of the isomers of stilbenedicarboxylic acid are distinguished from one another.

Stilbenedicarboxylic acid polyesters containing sulfonate groups are disclosed in U.S. Pat. No. 4,073,777. Example 6 illustrates a low molecular weight polyester containing 10 wt. % 4,4'-stilbenedicarboxylic acid which is useful for radiation crosslinkable water dispersible coatings. Also, in a general listing of glycols useful for the invention (Column 3, line 27), propylene glycol is mentioned but no examples are given.

In U.S. Pat. No. 3,190,764, Column 3, line 27 and in U.S. Pat. No. 3,247,043, Column 3, line 29, polyesters of stilbenedicarboxylic acid and 1,2-propanediol are disclosed, but no examples are given.

Other U.S. patents which disclose stilbenedicarboxylic acid polyesters are U.S. Pat. Nos. 2,657,194, 3,842,040, and 3,842,041. No 1,2-propanediol polymer examples are given. Polyesters of trans-4,4'-stilbenedicarboxylic acid and neopentyl glycol, 1,5-pentanediol, 1,6-hexanediol, and 1,10-decanediol are disclosed by Meurisse et al in the British Polymer Journal, Vol. 13, 1981, page 57 (Table 1).

PRACTICE OF THE INVENTION

The prior art discloses molding, spinning, and extruding into film as viable processes for shaping the polymers based on stilbenedicarboxylic acid. We have discovered a range of polymer compositions based on 1,2-propanediol and the trans-4,4'-stilbenedicarboxylic acid (SDA) isomer within this broad disclosure which exhibit exceptionally high strength and stiffness when molded, extruded, or spun. Injection molded polymers containing repeating units from about 60 to 100 mol % trans-4,4'-stilbenedicarboxylic acid, 0 to 40 mol % repeating units from terephthalic acid or 2,6-naphthalenedicarboxylic acid, and 100 mol % repeating units from 1,2-propanediol exhibit a flexural modulus of about $9.0 \times 10^5$ psi or more and a tensile strength $> 18.0 \times 10^3$ psi.

The polyesters of this invention are prepared from trans-4,4'-stilbenedicarboxylic acid and or its esters, terephthalic acid and 2,6-naphthalenedicarboxylic acid or their esters, and 1,2-propanediol. Examples of useful acid esters are the dimethyl, diethyl, dipropyl, dibutyl, diphenyl, or any combination of these mixed esters.

The terephthalic acid or 2,6-naphthalenedicarboxylic acid portion of the polymer may vary from 0 to about 40 mol %, preferably 5 to 40 mol %, such that the total dicarboxylic acid content of the polymers is 100 mol %. The terephthalic acid or 2,6-naphthalenedicarboxylic acid portion of the polymer may be replaced with up to 10 mol % of isophthalic acid. The terephthalic acid portion may also be replaced with a substituted terephthalic acid such as 2-chloro, 2-methyl, 2-ethyl, 2-propyl, 2,5-dichloro-, or 2,5-dimethyl terephthalic acid. Terephthalic acid or 2,6-naphthalenedicarboxylic acid is preferred.

The trans-4,4'-stilbenedicarboxylic acid content of the polymer may vary from 100 to 60 mol %, preferably 95 to 60 mol %, such that the sum of the total dicarboxylic acid content of the polymer is 100 mol %. The inherent viscosities of the polymers are at least 0.3 and preferably at least 0.4. The polymers are prepared in the melt or by solid-phase polymerization of ground polymer or a combination of these processes.

The following examples illustrate the unobviously high strength and stiffness of these copolymers.

This invention can be further illustrated by the following examples of preferred embodiments thereof, although it will be understood that these examples are included merely for purposes of illustration and are not intended to limit the scope of the invention unless otherwise specifically indicated.

EXAMPLES

All inherent viscosities are determined at 25° C. in 60/40 (wt./wt.) phenol/tetrachloroethane (PTCE) at a concentration of 0.5 g./100 mL.

The polyesters are dried at 80° to 100° C. for 24 hours in a vacuum oven and injection-molded on a one-ounce Watson-Stillman molding machine to give $2\frac{1}{2} \times \frac{3}{8} \times 1/16$ inch tensile bars and $5 \times \frac{1}{2} \times \frac{1}{8}$ inch flexure bars. ASTM procedures are used for measuring the tensile strength (ASTM D-1708) and flexural modulus (ASTM D-790).

Fibers are spun on an Instron Melt Rheometer Model 3211 through a capillary (0.014 inch in diameter)

equipped with a capillary heater. The design of the capillary allows use of a filtering system such as a wire screen and sand or stainless steel powder. Tensile properties of the fibers are determined using a standard one-inch gauge length for single filaments. Fibers are glued to a paper substrate prior to tensile testing to reduce damage to the single filaments from the clamps.

1. The following example illustrates the preparation of a polymer containing 100 mol % trans-4,4'-stilbenedicarboxylic acid and 100 mol % 1,2-propanediol.

A mixture of 236.8 g. (0.8 mol) dimethyl trans-4,4'-stilbenedicarboxlyate, 182.4 g. 1,2-propanediol (2.4 mol), 0.15 g. titanium tetraisopropoxide (100 ppm Ti) and 0.10 g. zinc acetate (125 ppm Zn) is placed in a one-liter flask equipped with an inlet for nitrogen, a metal stirrer, and a short distillation column. The flask is heated at 190° C. for 10 hours, 210° C. for 1 hour, 240° C. for ¾ hour, then a vacuum is applied gradually as the temperature is raised to 260° C. Full vacuum of 0.5 mm. is maintained for 30 minutes. The light yellow, opaque polymer has an I.V. of 0.38.

The polymer is ground to pass a 3 mm. screen and is solid-phase polymerized by heating from room temperature to 210°–215° C. over 1 hour and then by heating for 6 hours at 210°–215° C. The polymer has an I.V. of 0.68.

The solid-phased polymer is molded at 280° C. to give molded bars with a flexural modulus of $16.7 \times 10^5$ psi and a tensile strength of $28.8 \times 10^3$ psi.

2. The polymer containing 95 mol % trans-4,4'-stilbene dicarboxylic acid, 5 mol % terephthalic acid, and 100 mol % 1,2-propanediol is prepared according to the procedure of Example 1 to an I.V. of 0.41.

The polymer is ground to pass a 3 mm. screen, dried, and solid-phase polymerized by heating the polymer at 215° C. for 5 hours to an I.V. of 0.67.

The polymer is dried and molded to give molded bars with a flexural modulus of $15.0 \times 10^5$ psi and a tensile strength of $28.0 \times 10^3$ psi.

The following example illustrates the unobviously high tenacity and modulus of the copolyester fibers.

3. The polymer containing 95 mol % trans-4,4'-stilbenedicarboxylic acid, 5 mol % terephthalic acid, and 100 mol % 1,2-propanediol is prepared according to the procedure of Example 1 to an I.V. of 0.41.

The polymer is spun on the Instron Melt Rheometer equipped with a capillary (length to diameter ratio of 50) and a filter consisting of 0.4 g. 40/60 mesh sand supported by two 60 mesh screens. The barrel temperature is 240° C. and the capillary is 335° C. As-spun fiber taken at 800 ft./min. is 6.3 denier/filament and has 6.3 g./den tenacity and 282 g./den modulus.

4. The polymer containing 80 mol % trans-4,4'-stilbenedicarboxylic acid, 20 mol % 2,6-naphthalenedicarboxylic acid, and 100 mol % 1,2-propanediol is prepared according to the procedure of Example 1 to an I.V. of 0.54.

The polymer is dried and molded at 250° C. as described in the previous examples. Molded bars have a flexural modulus of $14.2 \times 10^5$ psi.

5. The following example illustrates the preparation of a polymer containing 60 mol % trans-4,4'-stilbenedicarboxylic acid, 40 mol % terephthalic acid, and 100 mol % 1,2-propanediol.

A mixture of 159.8 g. (0.54 mol) dimethyl trans-4,4'-stilbenedicarboxylate, 69.8 g. (0.36 mol) dimethyl terephthalate, 205.2 g. (2.7 mols) 1,2-propanediol, 0.14 g. titanium tetraisopropoxide (100 ppm Ti), and 0.084 g. zinc acetate (125 ppm Zn) is placed in a one-liter flask equipped with an inlet for nitrogen, a metal stirrer, and a short distillation column. The flask is heated by a Woods' metal bath at 185°–190° C. for 7 hours, 210° C. for 1 hour, 240° C. for ½ hour and then a vacuum is applied gradually as the temperature is raised to 260° C. Full vacuum of 0.5 mm. is maintained for 1½ hours. The clear, orange, high melt viscosity polymer turns opaque on cooling and has an I.V. of 0.46.

The polymer is ground to pass a 3 mm. screen, dried at 80° C. in a vacuum oven and molded at 260° C. to give molded bars with $8.9 \times 10^5$ psi flexural modulus and $18.9 \times 10^3$ psi tensile strength.

The remaining 1,2-propanediol polymers in Table 1 and the following comparative examples containing 1,3-propanediol, 2,2-dimethyl-1,3-propanediol, 1,5-pentanediol, 1,6-hexanediol, and 1,4-cyclohexanedimethanol are prepared using procedures similar to those of Examples 1–5.

6. U.S. Pat. No. 3,496,839 discloses polymers of 4,4'-stilbenedicarboxylic acid and 1,3-propanediol (Column 2, line 29). For comparison with the polymer of our invention, we prepared a polymer of 90 mol % trans-4,4'-stilbenedicarboxylic acid, 10 mol % terephthalic acid, and 100 mol % 1,3-propanediol using a procedure similar to Example 1 to an I.V. of 0.81.

The polymer is dried, ground and molded at 290° C. Molded bars have $2.6 \times 10^5$ psi flexural modulus and $6.0 \times 10^3$ psi tensile strength.

7. The polymer of 80 mol % trans-4,4'-stilbenedicarboxylic acid, 20 mol % terephthalic acid, and 100 mol % 1,3-propanediol is prepared as in Example 1 to an I.V. of 0.91.

The polymer is dried, ground, and molded at 280° C. Molded bars have $2.5 \times 10^5$ psi flexural modulus and $12.1 \times 10^3$ psi tensile strength.

8. U.S. Pat. No. 3,496,839 gives examples of the preparation of polyesters of trans-4,4'-stilbenedicarboxylic, terephthalic acid, and neopentyl glycol. For comparison of our polymers with those in U.S. Pat. No. 3,496,839, we prepared a polymer containing 60 mol % trans-4,4'-stilbenedicarboxylic acid, 40 mol % terephthalic acid, and 100 mol % neopentyl glycol.

A mixture of 142.1 g. (0.48 mol) dimethyl trans-4,4'-stilbenedicarboxylate, 62.1 g. (0.32 mol) dimethyl terephthalate, 166.4 g. (1.6 mols) neopentyl glycol, and 0.15 g. titanium tetraisopropoxide (100 ppm Ti) is placed in a one-liter flask equipped as in Example 1. The flask is heated at 200° C. for 1 hour, at 240° C. for ½ hour and at 260° C. for ½ hour. A vacuum of 0.5 mm. is applied gradually and the temperature is raised to 280° C. After about 35 to 40 minutes at 280° C., a clear, yellow, high melt viscosity polymer is obtained with an I.V. of 0.89.

The polymer is ground, dried, and molded as described in Example 1. The molded bars have a flexural modulus of $3.1 \times 10^5$ psi and a tensile strength of $7.4 \times 10^3$ psi.

9. The polymer of 100 mol % trans-4,4'-stilbenedicarboxylic acid and 100 mol % 1,5-pentanediol as disclosed in Example 5 of U.S. Pat. No. 2,657,195 is prepared using a procedure similar to our Example 1.

A clear, light yellow polymer turns opaque on cooling and has an I.V. of 1.1.

The polymer is ground and molded at 290° C. Molded bars have a flexural modulus of 2.5×10⁵ psi and a tensile strength of 12.5×10³ psi.

10. The polymer of 100 mol % trans-4,4'-stilbenedicarboxylic acid and 100 mol % 1,6-hexanediol disclosed in Japanese Kokai No. 72348/74 as a polymer blend with poly(1,4-butylene terephthalate) is prepared as in Example 1. The opaque fibrous polymer has an I.V. of 0.98.

The polymer is ground and molded at 260° C. Molded bars have 8.8×10⁵ psi flexural modulus and 18.0×10³ psi tensile strength.

11. U.S. Pat. No. 3,496,839 discloses polymers of trans-4,4'-stilbenedicarboxylic acid and 1,4-cyclohexanedimethanol (Column 2, line 29). For comparison with the polymers of our invention, we prepared a polymer containing 60 mol % trans-4,4'-stilbenedicarboxylic acid, 40 mol % terephthalic acid, and 100 mol % 1,4-cyclohexanedimethanol.

A mixture of 133.2 g. (0.45 mol) dimethyl trans-4,4'-stilbenedicarboxylate, 58.2 g. (0.30 mol) dimethyl terephthalate, 185.1 g. (0.90 mol) 1,4-cyclohexanedimethanol (70% trans), and 0.15 g. titanium tetraisopropoxide (100 ppm Ti) is placed in a one-liter flask equipped as in Example 1. The flask is heated at 200° C. and the temperature is raised immediately to 300° to 310° C. over the next hour. After ~30 minutes at 300° to 310° C. a vacuum of 0.5 mm. is gradually applied. The vacuum is maintained for 15 minutes. A slightly hazy, high melt viscosity, light yellow polymer is obtained with an I.V. of B 0.82.

The polymer is ground, dried, and then molded at 290° C. as described in Example 1. The molded bars have a flexural modulus of 2.8×10⁵ psi and a tensile strength of 10.4×10³ psi.

TABLE 1

COMPARISON OF TRANS-4,4'-STILBENEDICARBOXYLIC ACID/-TEREPHTHALIC ACID/GLYCOL COPOLYESTER MOLDING PLASTIC PROPERTIES

| Glycol | SDA, Mol %[a] | TPA, Mol %[a] | I.V.[b] | Flexural Modulus, 10⁵ psi | Tensile Strength, 10³ psi | Example No. |
|---|---|---|---|---|---|---|
| 1,2-propanediol | 100 | 0 | 0.68 | 16.7 | 28.8 | 1 |
|  | 95 | 5 | 0.67 | 15.0 | 28.0 | 2 |
|  | 80 | 20[c] | 0.54 | 14.2 | — | 4 |
|  | 70 | 30 | 0.45 | 12.3 | 26.1 | — |
|  | 60 | 40 | 0.46 | 8.9 | 18.9 | 5 |
|  | 50 | 50 | 0.43 | 3.0 | 10.7 | — |
| 1,3-propanediol | 90 | 10 | 0.81 | 2.6 | 6.0 | 6 |
|  | 80 | 20 | 0.91 | 2.5 | 12.1 | 7 |
| 2,2-dimethyl-1,3-propanediol | 100 | 0 | 0.74 | 3.0 | 10.7 | — |
|  | 80 | 20 | 0.80 | 3.0 | 7.2 | — |
|  | 60 | 40 | 0.89 | 3.1 | 7.4 | 8 |
|  | 50 | 50 | 0.70 | 2.6 | 8.0 | — |
| 1,5-pentanediol | 100 | 0 | 1.10 | 2.5 | 12.2 | 9 |
| 1,6-hexanediol | 100 | 0 | 0.98 | 8.8 | 18.0 | 10 |
| 1,4-cyclohexane-dimethanol (70% trans) | 100 | 0 |  | ** |  |  |
|  | 95 | 5 |  | ** |  |  |
|  | 70 | 30 | 0.76 | 3.0 | 10.9 | — |
|  | 60 | 40 | 0.82 | 2.8 | 10.4 | 11 |
|  | 50 | 50 | 0.79 | 2.5 | 10.0 | — |

[a]SDA is trans-4,4'-stilbenedicarboxylic acid; TPA is terephthalic acid.
[b]I.V. is inherent viscosity.
[c]The terephthalic acid portion of this polymer has been replaced with 20 mol % 2,6-naphthalenedicarboxylic acid.
**Too high melting to mold.

The invention has been described in detail with particular reference to preferred embodiments thereof, but it will be understood that variations and modifications can be effected within the spirit and scope of the invention.

We claim:

1. A polyester comprising repeating units prepared from 100 to 60 mol % trans-4,4'-stilbenedicarboxylic acid or esters thereof, repeating units prepared from 0 to 40 mol % terephthalic acid or 2,6-naphthalenedicarboxylic acid or esters thereof, and repeating units prepared from 1,2 propanediol, said polyester having an inherent viscosity of about 013 or more determined at 25° C. in 60/40 (wt./wt.) phenol/tetrachloroethane (PTCE) at a concentration of 0.5 g./100 mL and said polyester when injection molded into ⅛ inch flexure bars exhibits a flexural modulus of about 900,000 psi or more.

2. Polyester of claim 1 wherein the repeating units from the terephthalic acid or 2,6-naphthalenedicarboxylic acid portion of the polyester are present in the amount of about 5 to about 40 mol %.

3. Polyester of claim 2 wherein the terephthalic acid repeating units of the polyester are prepared from substituted terephthalic acid selected from 2-chloro, 2,5-dichloro, 2-methyl, 2-ethyl, 2-propyl or 2,5-dimethyl terephthalic acid or esters thereof.

4. Polyester of claim 2 wherein up to about 10 mol % of the repeating units of terephthalic acid or 2,6-naphthalenedicarboxylic acid are replaced with repeating units from isophthalic acid.

5. Polyester of claim 1 wherein repeating units from said 1,2-propanediol are replaced with up to about 10 mol % of repeating units from another glycol having 2 to 8 carbon atoms.

* * * * *